(No Model.) 2 Sheets—Sheet 1.

E. I. TENNANT.
VEHICLE BODY.

No. 530,977. Patented Dec. 18, 1894.

WITNESSES:
H. B. Bradshaw
Chas. I. Welch

INVENTOR
Edward I. Tennant
BY Shepherd
ATTORNEYS (No Model.) 2 Sheets—Sheet 2.

E. I. TENNANT.
VEHICLE BODY.

No. 530,977. Patented Dec. 18, 1894.

WITNESSES:
H. B. Bradshaw
Chas. I. Welch

INVENTOR
Edward I. Tennant
BY
ATTORNEYS

UNITED STATES PATENT OFFICE.

EDWARD I. TENNANT, OF SPRINGFIELD, OHIO.

VEHICLE-BODY.

SPECIFICATION forming part of Letters Patent No. 530,977, dated December 18, 1894.

Application filed April 14, 1894. Serial No. 507,562. (No model.)

*To all whom it may concern:*

Be it known that I, EDWARD I. TENNANT, a citizen of the United States, residing at Springfield, in the county of Clark and State of Ohio, have invented certain new and useful Improvements in Vehicle-Bodies, of which the following is a specification.

My invention relates to improvements in vehicle bodies, and it especially relates to bodies for vehicles designed for hauling or delivering small parcels or packages of merchandise.

My invention consists in the various constructions and combinations of parts hereinafter described and set forth in the claims.

Figure 1:
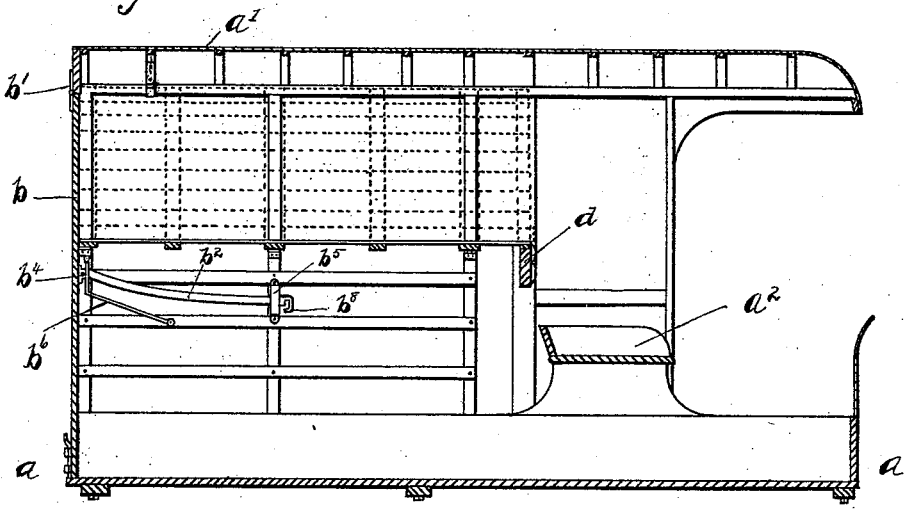
Figure 2:
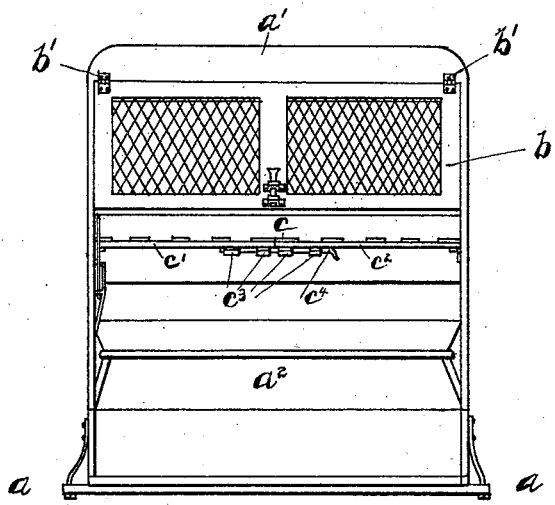
Figure 5:
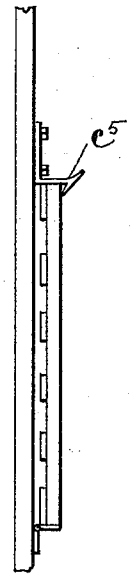
Figure 4:
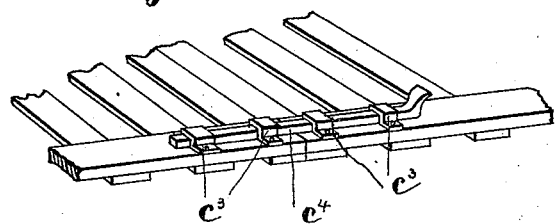
Figure 3:
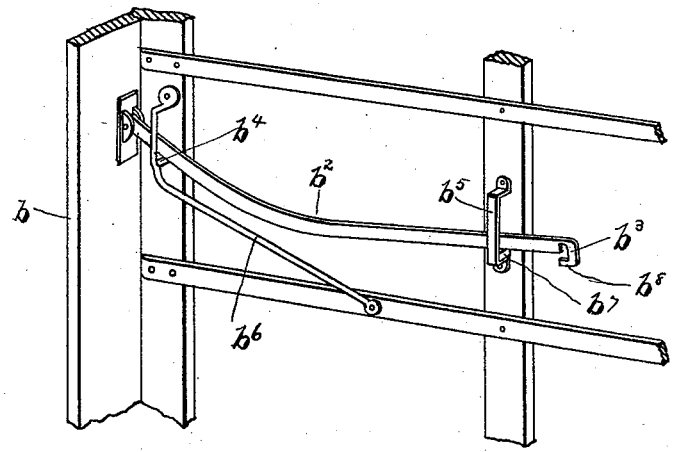

In the accompanying drawings, Figure 1 is a sectional elevation of a vehicle body to which my invention is applied. Fig. 2 is a rear elevation of the same. Figs. 3, 4 and 5 are details of some of the parts hereinafter referred to.

Like parts are represented by similar letters of reference in the several views.

In the said drawings, $a\ a$ represent the body or bed proper, $a'$ the top, and $a^2$ the seat. The rear of the body is closed by a hinged door $b$, preferably hinged at $b'\ b'$ at the top, as shown in Fig. 2. Hinged to the door $b$ on the inside is a curved supporting bar $b^2$, having at one end a hook-shaped projection $b^3$, adapted to slide through suitable supporting bearings $b^4\ b^5$. The bearing $b^4$ preferably consists of a U-shaped metallic piece formed integral with a brace rod $b^6$, which extends from said bearing and is secured to a convenient portion of the body; the U-shaped portion of said bearing being adapted to embrace the hinged bar $b^2$ secured to the door. The bearing $b^5$ is provided at the bottom with a rubber or elastic cushion $b^7$, on which the bar $b^2$ is adapted to rest when in its normal position with the door closed, in which position the bar $b^2$ is raised slightly above the lower support of the bearing $b^4$, thus preventing any rattling of the parts from the movement of the vehicle. As the door $b$ is turned on its hinges to open the same, the curved portion of the bar $b^2$ is brought into contact with the bearing $b^4$, thus elevating the free end of said bar so that the hook-shaped end $b^3$ of said bar will clear the cushion $b^7$ in the bearing $b^5$ and permit the same to pass through said bearing. As the door is further opened the hook-shaped portion $b^3$ of the supporting bar $b^2$ engages with the bearing $b^4$ and thus holds the door or gate in an elevated position. The hook-shaped end $b^3$ of the bar $b^2$ is formed with a forwardly extending lip $b^8$, which engages with the bottom of the bearing $b^4$ as the door is opened, and thus prevents the bar $b^2$ from being raised so as to draw through the bearing $b^4$; the movement of the door being thus securely limited and the parts always retained in their operative position.

To provide for increasing the capacity of the body for small parcels, and at the same time affording an unencumbered space therein when desired, I provide a deck $c$, formed in two parts $c'\ c^2$, which parts are hinged to the sides of the body so as to fold up, as shown in Fig. 5 and indicated in dotted lines in Fig. 1. The respective parts of this deck are preferably formed of a skeleton construction and consist of suitable supporting bars and slats, as shown. The end bars next to the gate are provided with U-shaped bearing clips $c^3$, into which is adapted to slide a bolt $c^4$, which connects the parts firmly together and supports the ends thereof.

Extending transversely across the vehicle immediately back of the seat is a stationary bar $d$, which is upholstered to form a back for the seat of the vehicle; said bar being so arranged that the top of it stands on a line with the hinged connections of the deck so that when the parts of said deck are lowered it rests on said bar which thus firmly supports the same. Small retaining hooks $c^5$ are provided on the sides of the body to hold the hinged parts of the deck in an elevated position, as desired, and as shown in Fig. 5.

It will be seen that as thus constructed I provide a vehicle body particularly adapted for carrying parcels and bundles, the parts being constructed to be readily adjusted to the work to be performed.

Having thus described my invention, I claim—

1. In a vehicle body, a hinged deck formed in two parts, as described, a stationary bar to support one end of said deck and to form a back for the vehicle seat, and a sliding bolt for connecting the respective parts of said deck at the end opposite to said bar, and retaining devices for supporting the respective parts of said deck when turned on their hinged connection, substantially as specified.

2. The combination with the hinged door of the curved sustaining bar hinged at one end to said door and provided at the other with a hook having a shoulder and a forwardly projecting lip a brace formed with a U-shaped end to form a guide and stop for said sustaining bar an additional guide for the end of said sustaining bar the curved portion of said bar being adapted to bear on said U-shaped guide so as to elevate the end of said bar in passing through said second guide substantially as specified.

In testimony whereof I have hereunto set my hand this 11th day of April, A. D. 1894.

EDWARD I. TENNANT.

Witnesses:
 OLIVER H. MILLER,
 CHAS. I. WELCH.